W. B. THURMAN.
STRUCTURAL TOY.
APPLICATION FILED NOV. 22, 1915.
1,242,272.
Patented Oct. 9, 1917.
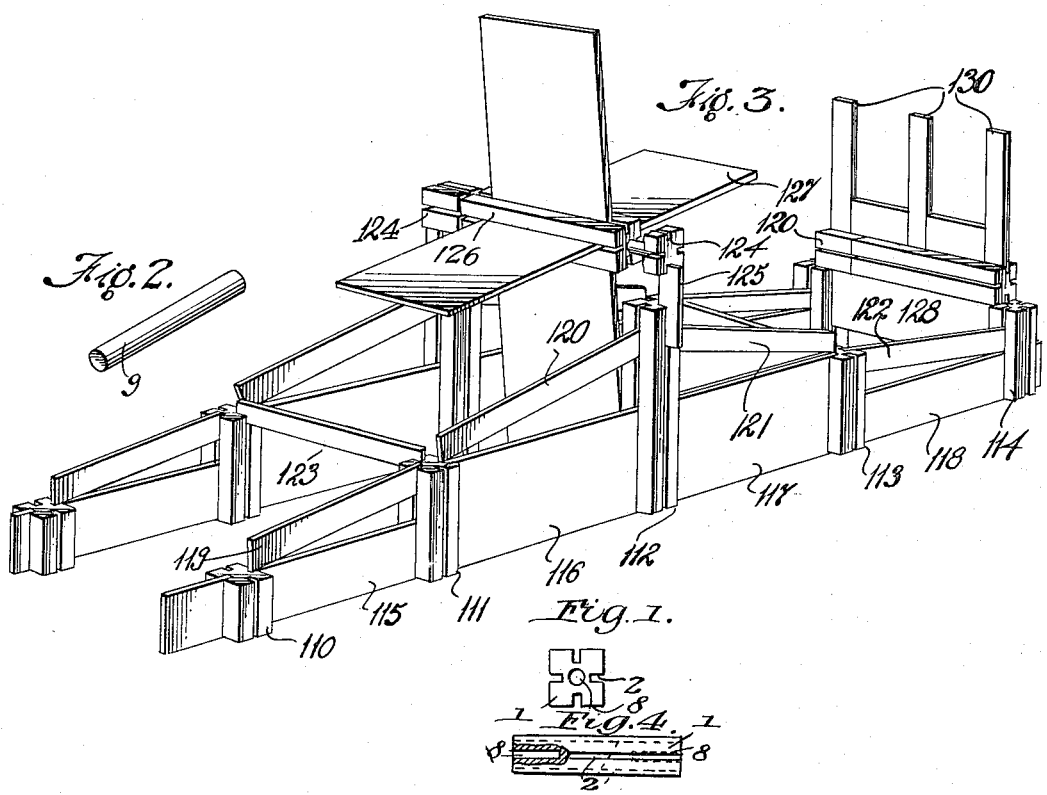

ures illustrated in the draw-

UNITED STATES PATENT OFFICE.

WILLIAM B. THURMAN, OF MADERA, CALIFORNIA.

STRUCTURAL TOY.

1,242,272.  Specification of Letters Patent.  Patented Oct. 9, 1917.

Application filed November 22, 1915. Serial No. 62,933.

*To all whom it may concern:*

Be it known that I, WILLIAM B. THURMAN, a citizen of the United States, residing at the city of Madera, county of Madera, State of California, (whose post-office address is Madera,) have invented new and useful Improvements in Structural Toys, of which the following is a specification.

This invention relates to amusement and educational devices.

Among the objects of this invention are, to produce a set of units of such form, that they may be joined together for the construction of representations of familiar objects;

To develop the constructive instinct in children, while affording a source of endless amusement, and gratification in seeing their ingenuity manifested in concrete objects:

To form the units of such material, preferably wood, and of such a nature, that small children or infants cannot be injured thereby.

Other objects and advantages will appear as the description progresses. In the drawings accompanying and forming part of the present specification to which like reference characters have been applied, I have disclosed my preferred manner for putting this invention into practice; but I do not wish to be understood as limiting this invention to the particular means disclosed in said description and drawings, as modifications and equivalents within the spirit of this invention, as defined in the claim succeeding said description, will suggest themselves to those skilled in this art.

The several parts making up a set of units in accordance with this invention, have a characteristic means for connection, each with the other, and these characteristics are common to each unit of a given type; whereby any two units or a multiplicity of units may be joined together, to form a representation of the design in the mind of the constructor.

The units are of two general types, a joining block or post having grooves in its sides, and a hole in its end and flat construction strips of varying width and shape, of a thickness to frictionally engage the grooves in the blocks, and dowels to fit said holes, for the objects previously set forth.

In the drawings:

Figure 1, is a detail in end elevation of one of the joining units.

Fig. 2, is a perspective view of a dowel adapted to engage a hole in the end of the joining block.

Fig. 3, is a similar representation of a water wheel, including flood gate and spill way.

Fig. 4 is a detail view partly broken away to show one of the longitudinally extending recesses in the blocks, such as 1.

In detail the construction illustrated in the drawings, includes a polygonal or cylindrical joining block 1, having any number of lateral planes or sides, or the block may be otherwise shaped. The grooves 2 are cut into these blocks, preferably opening in the planes thereof; it is obvious, however, that these grooves may open in the angles of the blocks, and may be sunken into the blocks at any desired angle or tangent.

The construction units to engage the joining blocks include flat strips, of various widths and lengths, and of a thickness at the ends equal to the width of the grooves, which they engage with sufficient friction to securely join the two units for the purpose intended. In addition to these parallel strips various shapes may be supplied. The joining blocks, are provided with the end holes 8, to receive the dowels 9. The holes are preferably not bored entirely through the block, so that the length of the dowel when inserted will leave a portion of the dowel projecting, to act as a trunnion or spindle, in the construction of wind mills, water wheels and like revolving objects, and the dowels are of somewhat less diameter than the holes 8 whereby any of the blocks may turn freely thereon and whereby the dowels may be easily inserted in and removed from the holes 8.

Those structures illustrated in the drawings involve three different lengths of joining blocks; four different lengths of strips, of three different widths. The variety and number of strips are merely a question of production, so long as they include a means for joining to each other in accordance with this invention. The adaptation of the invention, is a question of the constructive ingenuity of the operator. The units can be made to form letters of the alphabet, that may be constructed into words and phrases for educational purposes, and into conventional or fantastic objects for amusement.

This invention will go largely into the hands of small children, for that reason unpainted wood is the preferred material, as it contains no elements internally or externally dangerous to an infant. The slot or groove form of joining is preferred, as it is an integral part of the unit and cannot be removed and lost or separated from the units; for that reason it is preferred to any form of extraneous joining means.

Fig. 3 represents a water wheel supported above a sluice way. The sluice way is composed of the blocks 110, 111, 112, 113 and 114, joined by the strips 115, 116, 117 and 118, and bracing strips 119, 120, 121 and 122, and cross braced by the strips 123 joining the blocks 111 and 113 across the top thereof. The trunnion blocks 124 are supported by the strips 125 rising from the blocks 112. The block 126 forming the hub of the wheel is supported on dowels engaging the block 126 and the trunnion blocks 124. The blades of the water wheel are composed of the broad strips 127 extending outward from the four sides of the hub, the wheel being rotatable upon its trunnion dowels, the dowels being loose in the end apertures of the blocks, such as 8, whereby they may be easily inserted and removed and whereby the block 126 may revolve freely. The flood gate is represented by broad strip 128 set into the cross block 129 and engaging the grooves in the blocks 114. The upright levers of the flood gate are represented by the upstanding strips 130 engaging the upper groove in the block 129.

The above is one of the many combinations possible in constructing familiar objects from a set of toy blocks such as illustrated and described.

Having thus described this invention, what I claim and desire to secure by Letters Patent is:

The combination with a pair of joining blocks having grooved faces and end recesses extending part way therethrough, of a dowel loosely seated in said recesses.

In testimony whereof, I have hereunto set my hand this ———— day of August 1915.

WILLIAM B. THURMAN.

Witnesses:
 BALDWIN VALE,
 A. J. HENRY.